3,049,563
UREA SYNTHESIS
Julius H. Bochinski, La Habra, and Arthur L. Kohl and Robert C. Oliver, Whittier, Calif., assignors to The Fluor Corporation, Ltd., Los Angeles, Calif., a corporation of California
Filed Apr. 5, 1957, Ser. No. 650,876
12 Claims. (Cl. 260—555)

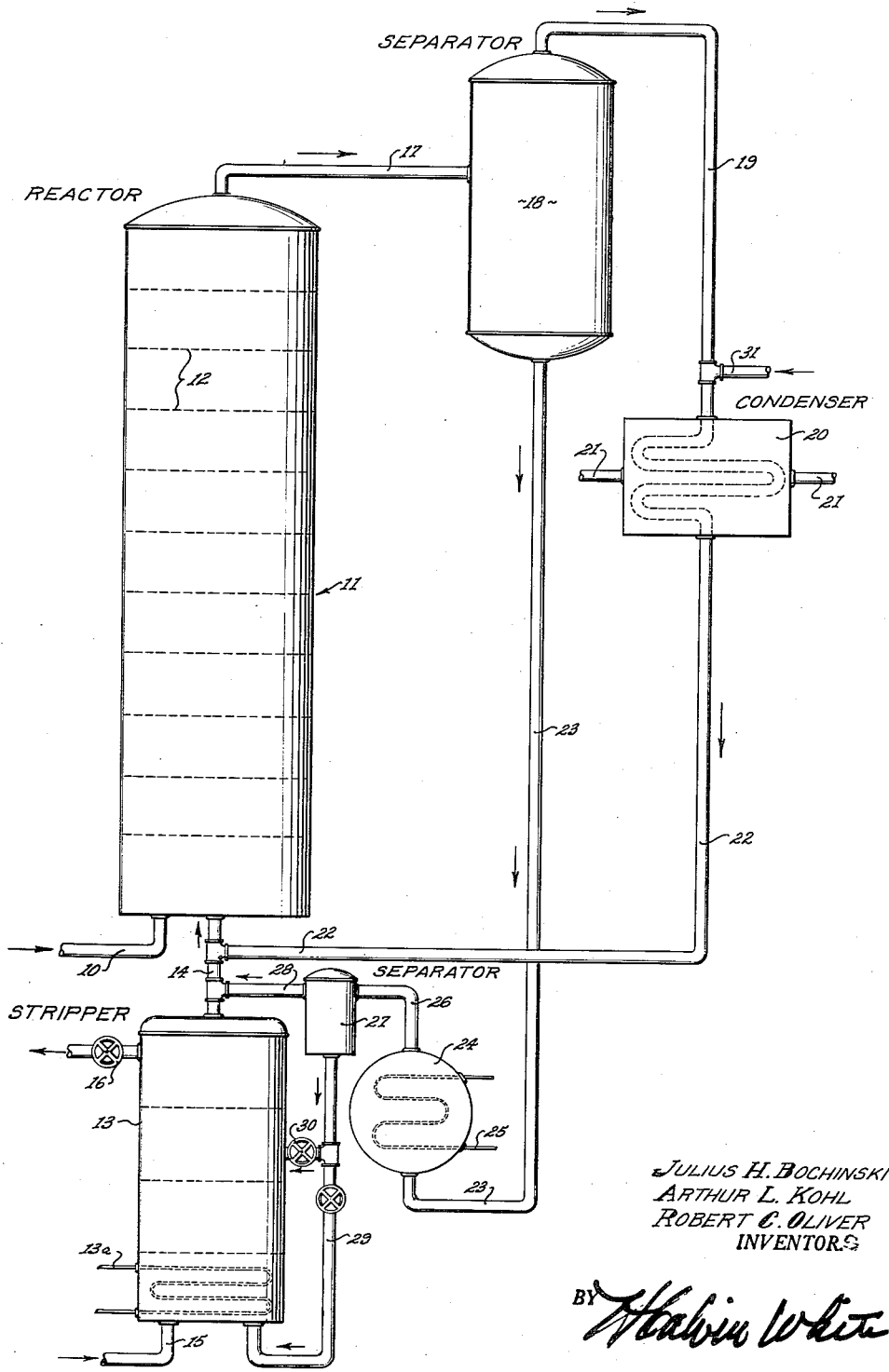

This invention relates to the synthesis of urea from ammonia and carbon dioxide, and has for its general object to provide an improved process for commercial production of urea, characterized by its capacity for high conversions to urea under desirable operating conditions of the reactants fed to the system.

It is generally known that some commercial processes for the manufacture of urea, require pressures as high as from 2500 to 6000 p.s.i. to obtain practicable yields of urea per pass of the reactants in the system. Increased yields per pass are obtained also by feeding to the reactor excess ammonia in relation to the carbon dioxide, but at the expense of increased operating pressures at equivalent temperatures. As to yields, commercial reactors range from 45 to 50 percent at stoichiometric feed ratios, up to around 80 percent for ammonia to carbon dioxide ratios of 6 to 1. For economical operation it is necessary to recycle the unconverted ammonia to the urea reactor, especially where large excesses of ammonia are used, and the recycling is complicated by the presence of large amounts of carbon dioxide in the unconverted mixture.

The present invention affords a process capable of effecting high urea yields without resorting to excessive pressures and in a system that obviates any difficulties involving separation of carbon dioxide from ammonia in recirculated reactor effluent. More specifically, the present process achieves our objectives by employing a closed system whereby reactants remaining unconverted in a single pass through the reactor are recirculated in a manner which permits their retention and ultimate conversion in the system to exceptionally high urea yields.

Further objects and the details of the invention will be fully understood from the following description of an illustrative embodiment as shown by the accompanying drawing.

It is to be understood that the drawing shows typically and illustratively appropriate equipment for carrying out the present process, and that various changes, consolidations or rearrangements of the physical equipment may be made without affecting the essential operations and novel aspects of the invention as a process.

Referring to the drawing, carbon dioxide is fed to the system through line 10 and at the bottom of a reaction zone 11 defined by a vertically extended column which may contain bubble trays or perforated plates 12 or other suitable means such as various known forms of column packing, all of which serve to effect division and intimate contact of the fluids passing through the column. Below is a stripping zone 13 which may be defined by a more or less vertically extended shell or column, communicating with the bottom of the reaction zone through line 14. The stripping zone, having a heating coil 13a, may also be regarded as a reboiler in view of the latter described heat supply to the fluids contained in the vessel 13, a stripping or reboiling effect occurring by reason of depletion of the liquid of vapor components passing to the reaction zone. Ammonia is fed to the base of the stripping zone 13 through line 15, and the product urea-containing stream is withdrawn through line 16 containing a valve beyond which the urea stream may be depressurized for such further treatment as may be given the stream for recovery and purification of the urea as a dry product.

The gaseous and vapor overhead from the reaction zone is passed through line 17 to a separator 18 from which ammonia, carbon dioxide and usually some water vapor pass through line 19 to condenser 20 cooled by fluid circulated through pipes 21, the condensate being recycled from the condenser through line 22 to the reaction zone 11, as by delivery into line 14. The liquid effluent from the separator 18 passes through line 23 to a heater 24 supplied with heat as by hot fluid passing through coil 25. The stream leaving the heater through line 26 is discharged into a second separator 27 from which the gaseous or vaporous components flow to the reaction zone as through pipe 28, the liquid being withdrawn from the separator 27 for delivery through line 29 to the stripping zone 13. Such delivery, whole or in part, may flow to the base of the separating zone, or some or all of the stream may be introduced at an intermediate location as through line 30.

In the operation of the system, carbon dioxide introduced through line 10, together with ammonia fed to the stripper through line 15, and in addition the streams being recirculated through lines 22 and 28, all flow cocurrently up through the reactor under pressure and temperature conditions such that ammonia and carbon dioxide react in the presence of water to form ammonium carbamate by exothermic reaction. Simultaneously some of the carbamate present in the stream undergoes endothermic conversion to urea. The net temperature effect ordinarily may be a small increase from the bottom to the top of the reaction zone. The reactor effluent comprising aqueous ammonium carbamate, urea, ammonia, carbon dioxide and water, is discharged through line 17 into separator 18, the overhead from which, and consisting essentially of ammonia, carbon dioxide and ordinarily some water vapor, flows through the condenser 20. The overhead stream, either before or after passage to the condenser is supplemented by the addition of an ammonia-containing stream introduced through line 31, which may be composed of aqueous ammonia with or without some ammonium carbamate. This supplementary stream may be derived from a urea recovery and purification plant, not shown, which receives the aqueous urea taken from the stripping zone through line 16. As previously explained, the condenser effluent, together with the supplementary ammonia, and comprising by reason of the cooling effect a substantially high percentage of dissolved ammonium carbamate, is recycled through line 22 to the reaction zone.

The liquid stream leaving the separator 18 through line 23, and consisting essentially of aqueous carbamate, urea and ammonia, passes through the heater 24 and thence into separator 27 from which the stream components vaporized by the heating, and comprising ammonia, water vapor and some carbon dioxide, are returned to the reaction zone through line 28. From separator 27, aqueous or dissolved ammonium carbamate and urea, together with some aqueous ammonia, pass through line 29 to the stripping zone.

Decomposition of the ammonium carbamate content of the separated stream in line 23, is accomplished by the dual effects of heating by coil 13a and intimate contact with the upwardly flowing stream of ammonia fed to the stream through line 15, the partial pressure effect of the ammonia tending to convert the carbamate to urea. Adequate intimacy and time of contact between the ammonia and liquid phases in the stripper are assured by designing the latter to have the equivalent of from say 1 to 3 theoretical or equilibrium stages. By virtue of the temperature and ammonia stripping effects in the reactor, and the close system return of the first separator 18 liquid effluent to the stripping zone, the system is productive of high urea yields withdrawn through line 16, which are in excess of 93 percent of the theoretical urea equivalent of the carbon dioxide fed to the system through line 10.

As to general operating conditions, the entire system including the reaction, separating, condensing and stripping zones, may be maintained under substantially the same pressure between about 900 to 2000 p.s.i., and preferably within the range of 1500 to 1750 p.s.i. The stripping zone and reaction zone temperatures may be within the same range of about 330 to 410° F., and preferably within the range of about 340 to 385° F. Generally speaking, the condenser 20 may operate to cool the fluid to a temperature within the range of about 200° F. to 330° F. depending upon the water content of the stream. To illustrate, with about 8 percent water the temperature should be not less than about 176° F.

The mole ratio of fresh ammonia fed to the stripping zone through line 15, to the product urea withdrawn therefrom through line 16, may be within the range of from 0 to 1, to 10 to 1, and preferably in the range of about 1.8 to 1 to 3.8 to 1. The carbon dioxide fed to the system through line 10 is governed by the following consideration: The system will operate at its minimum pressure for a given reaction zone outlet temperature when the ammonia and carbon dioxide in the vapor phase are in the stoichiometric ratio of 2 moles of ammonia to 1 mole of carbon dioxide. The conversion of ammonium carbamate to urea in the reaction zone can be increased by increasing the ratio of 2 moles of ammonia to 1 mole of carbon dioxide in the vapor phase, by a few percent.

While the quantity of aqueous ammonia introduced to the system through line 31 may be derived from any suitable source, it is advantageously obtained from that portion of the plant, not shown, in which the product urea may be purified by any of the usual procedures leaving aqueous ammonia (e.g. 50–80% ammonia) containing some ammonium carbamate which then becomes contained in the system as a whole, for ultimate conversion to urea, generally corresponding to the amount of dissolved ammonia in the effluent leaving the system through line 24, and which has been taken from the vapor phase in the reaction zone by dissolution in the carbamate solution therein. In general, the quantity of ammonia thus introduced, to give a minimum condenser pressure at given condenser temperature should be such that the vapor prior to condensation has an ammonia to carbon dioxide ratio of at least about 3.7 to 1.

The following is cited as typical specific conditions under which the system is operable to give product urea yields in excess of 93 percent equivalency to the carbon dioxide feed. Ammonia is fed to the stripping zone through line 15 at the rate of 306 moles per hour, and carbon dioxide is fed to the reactor through line 10 at 156 moles per hour. Employing in the reaction zone 11, pressure at about 110 atmospheres with a bottom temperature in the reactor of 400° F. and a top temperature of 350° F., the effluent streams from the separator 18 will have these compositions: The vapor flow to the condenser through line 19 contains 565 moles of ammonia, 268 moles of carbon dioxide, and 25 moles of water. The liquid stream being recirculated through line 23 contains 243 moles of ammonia, 299 moles of water, 156 moles of urea and 169 moles of ammonium carbamate. The ammonia supplement stream introduced through line 31 contains 262 moles of ammonia, 18 moles of ammonium carbamate and 100 moles of water. After cooling, the condensate goes to the reactor through line 22 at a temperature of approximately 275° F. The separated liquid stream in line 23 is heated in exchanger 24 to give a temperature in the stripping zone 13 of about 375° F. The liquid product drawn off through line 16 contains hourly moles of 206 moles of ammonia, 256 moles of water, 156 moles of urea, and 18 moles of ammonium carbamate.

The system is capable of operating under different control conditions having to do with control in the condensation of the reaction zone overhead gases and vapors. For example, the condenser 22 may be given adequate cooling capacity to condense substantially all of the carbon dioxide, ammonia and water vapor from the reaction zone. Under these conditions, condenser 18 becomes ineffective or unnecessary. The aqueous ammonia, or ammonia and carbamate stream, introduced to the condensing zone 23 through line 21, joins with the condensate which consists essentially of ammonia, ammonium carbamate and water, for downward passage to the reaction zone 10. The vapors from the reaction zone contain ammonia and carbon dioxide in about stoichiometric ratios.

As another alternative, the condensing zone may consist only of the external condenser 18 which receives the reaction zone overhead vapors at a temperature of about 350° F., the vapors containing ammonia and carbon dioxide in about stoichiometric proportions, with a small amount of water. The condensate going to line 20 will consist essentially of ammonium carbamate, free ammonia and some water. Through line 21 is fed an ammonia-containing stream which, as before, may be aqueous ammonia with or without ammonium carbamate.

Another contemplated procedure involves condensing essentially all the carbon dioxide and a portion of ammonia vapors from the reaction zone, by means of coil 22. The remaining vapors in line 17 are condensed in the external condenser 18, the vapors consisting essentially of ammonia with traces of carbon dioxide and water at a temperature of about 270° F. Here the reflux stream returned through line 20 will consist essentially of aqueous ammonia. To this stream is added additional ammonia, or ammonia and ammonium carbamate through line 21. Under these conditions, ammonia is constantly being cycled between the condensing zones 23 and 18, producing a cooling and condensing effect in zone 23 by reason of condensation of the ammonia in 18 and vaporization, with accompanying cooling, of the recycle ammonia in zone 23.

We claim:

1. The process for synthesizing urea that includes feeding ammonia into a stripping zone for upward flow therein into a reaction zone, feeding carbon dioxide into the lower portion of the reaction zone for admixture with ammonia from the stripping zone and flowing the carbon dioxide and ammonia concurrently in an aqueous stream upwardly through the reaction zone and therein reacting the carbon dioxide and ammonia to form ammonium carbamate and urea, passing said aqueous stream including liquid and gaseous components from the reaction zone into a separating zone, passing the separated liquid including ammonium carbamate and urea from said separating zone to said stripping zone, passing a stream of separated carbon dioxide and ammonia from said separating zone through a condensing zone and returning to the reaction zone the cooled condensing zone effluent, heating the stripping zone liquid to supplement the effect of the ammonia in promoting conversion of carbamate to carbon dioxide and ammonia, maintaining the reaction and stripping zones at substantially the same pressure, and withdrawing the urea from the stripping zone.

2. The process as defined by claim 1, in which the liquid passed from said separating zone is heated and then fed into the stripping zone.

3. The process as defined by claim 1, in which the liquid passed from said separating zone is heated and passed through a second separating zone from which ammonia, carbon dioxide and some water vapor are flowed into the reaction zone and the residual liquid is fed to the stripping zone.

4. The process as defined by claim 1, in which ammonia and water are added to the separated stream which is passed through the condensing zone.

5. The process as defined in claim 3, in which ammonia and water are added to the separated stream which is passed through the condensing zone.

6. The process as defined in claim 1, in which ammonia and water are added to the separated stream which is passed through the condensing zone and the resulting mixture is passed into the lower portion of the reaction zone.

7. The process as defined in claim 1, in which the liquid passed from said separating zone is heated and then fed into the lower portion of said stripping zone, and ammonia and water are added to the separated stream which is passed through the condensing zone and the resulting mixture is passed into the lower portion of the reaction zone.

8. The process as defined by claim 1, in which the reaction, separating, condensing and stripping zones are maintained under substantially the same pressure between about 900 and 2000 p.s.i.

9. The process as defined by claim 1, in which the reaction, separating, condensing and stripping zones are maintained under substantially the same pressure between about 900 and 2000 p.s.i. and in which the stripping zone temperature is between about 330° F. to 410° F.

10. The process as defined by claim 1, in which the ammonia feed rate to the stripping zone is at a mole ratio of ammonia to urea withdrawn from the zone, between about 1.8 to 1 and 3.8 to 1.

11. The process as defined by claim 9, in which the mole ratio of unreacted ammonia to carbon dioxide in the lower portion of the reaction zone is between 1.5 to 1 and 3.0 to 1.

12. The process as defined by claim 9, in which the carbon dioxide and ammonia are reacted to a degree at completeness such that the urea withdrawn from the reaction zone is equivalent to at least about 93% of said feed carbon dioxide introduced to the reaction zone.

References Cited in the file of this patent

UNITED STATES PATENTS

| | | |
|---|---|---|
| 1,937,116 | Hetherington | Nov. 28, 1933 |
| 2,056,283 | Lawrence et al. | Oct. 6, 1936 |
| 2,212,847 | Porter | Aug. 27, 1940 |
| 2,214,068 | Rogers et al. | Sept. 10, 1940 |
| 2,701,262 | Cook | Feb. 1, 1955 |
| 2,807,574 | Hirano | Sept. 24, 1957 |
| 2,848,493 | Dewling et al. | Aug. 19, 1958 |

OTHER REFERENCES

Tonn: Chemical Engineering (October 1955), pages 186–90.